(12) United States Patent
Phillips et al.

(10) Patent No.: US 8,560,150 B1
(45) Date of Patent: Oct. 15, 2013

(54) METHODS AND SYSTEMS FOR LANDING DECISION POINT

(75) Inventors: Thomas J. Phillips, Seattle, WA (US); Jean M. Crane, Seattle, WA (US)

(73) Assignee: The Boeing Company, Chicago, IL (US)

( * ) Notice: Subject to any disclaimer, the term of this patent is extended or adjusted under 35 U.S.C. 154(b) by 166 days.

(21) Appl. No.: 13/176,567

(22) Filed: Jul. 5, 2011

Related U.S. Application Data

(60) Provisional application No. 61/362,225, filed on Jul. 7, 2010.

(51) Int. Cl.
*G06F 19/00* (2011.01)

(52) U.S. Cl.
USPC .......... 701/16; 701/14; 701/15; 701/18; 701/70; 700/106; 705/13; 340/947; 303/126

(58) Field of Classification Search
USPC .......... 701/14, 15, 16, 18, 70; 700/106; 705/13; 340/947; 303/126
See application file for complete search history.

(56) References Cited

U.S. PATENT DOCUMENTS

| | | | |
|---|---|---|---|
| 5,968,106 A | 10/1999 | DeVlieg et al. | |
| 6,991,304 B2 | 1/2006 | Villaume | |
| 7,014,146 B2 | 3/2006 | Villaume et al. | |
| 7,139,645 B2 | 11/2006 | Villaume et al. | |
| 7,340,327 B2 | 3/2008 | Villaume et al. | |
| 7,586,422 B2 | 9/2009 | Goodman et al. | |
| 7,626,513 B2 | 12/2009 | Goodman et al. | |
| 7,720,579 B2 | 5/2010 | Goodman et al. | |
| 7,818,100 B2 | 10/2010 | Goodman et al. | |
| 8,195,347 B2 * | 6/2012 | Boorman | 701/16 |
| 2003/0200138 A1 * | 10/2003 | Smith et al. | 705/13 |
| 2004/0026992 A1 * | 2/2004 | Villaume | 303/126 |
| 2004/0054448 A1 * | 3/2004 | Ito | 701/14 |
| 2009/0048724 A1 * | 2/2009 | Caule | 701/16 |
| 2009/0125168 A1 * | 5/2009 | Voisin | 701/15 |
| 2009/0210082 A1 * | 8/2009 | Tartock et al. | 700/106 |
| 2009/0292433 A1 | 11/2009 | Goodman et al. | |
| 2010/0070115 A1 * | 3/2010 | Villaume | 701/18 |
| 2010/0305786 A1 * | 12/2010 | Boorman | 701/16 |
| 2011/0074607 A1 * | 3/2011 | Khatwa et al. | 340/947 |
| 2011/0144875 A1 * | 6/2011 | Rado | 701/70 |
| 2011/0166723 A1 * | 7/2011 | Valentova et al. | 701/16 |

\* cited by examiner

*Primary Examiner* — James Trammell
*Assistant Examiner* — Sanjeev Malhotra
(74) *Attorney, Agent, or Firm* — The Boeing Company; Brook Assefa

(57) ABSTRACT

Methods and systems for a go/no-go Landing Decision Point (LDP) are disclosed. The methods and systems provide a graphical LDP on a cockpit display that pilots can use to determine whether to continue the landing or execute a go-around. The methods and systems may be implemented in embodiments having an onboard portion, an off-board portion, or both operatively coupled to provide an LDP in a preview/planning mode and real time mode.

6 Claims, 6 Drawing Sheets

METHODS AND SYSTEMS FOR LANDING DECISION POINT

RELATED PROVISIONAL APPLICATION

This application is related to and claims the benefit of priority of provisional U.S. Patent Application Ser. No. 61/362,225, filed Jul. 7, 2010, entitled "Methods and Systems for Landing Performance Decision Aid", which is incorporated herein in its entirety by reference.

TECHNICAL FIELD

Aspects of the present disclosure are directed to aircraft landing performance decision aid methods and systems.

BACKGROUND

Modern commercial aircraft are equipped with several airplane systems to manage an aircraft's performance and to report to the pilots (flight crew) if the aircraft is not performing to the expected performance level. For example, during the landing phase of flight, a number of aircraft systems involving the aircraft's flight control, propulsion, navigation, thrust management, flight management, warning/advisory, and displays may be utilized to monitor and determine whether the aircraft's landing performance is satisfactory. However, in the end, the final determination on whether to land the aircraft or execute a go-around rests with the pilots.

The landing phase of flight is one of the most critical phases of flight. Whether a manual or automatic landing is being performed, pilots must vigilantly monitor not only the performance of airplane systems but also the progression of the landing to execute a safe landing and roll out. One characteristic of all landings is the requirement to ensure the aircraft touches down at a point on the runway such that it can decelerate and stop, or exit the runway onto a taxi way, within the runway remaining. Thus, during the landing phase of flight, pilots are focused on landing their aircraft in the touchdown zone to ensure there is enough runway for a successful deceleration and rollout.

The touchdown zone is typically the first one third of the runway with the touchdown point being the mid-point of the zone. The touchdown point in the touchdowns zone, which may be different for each landing, is affected by a number of factors including but not limited to the aircraft's weight and configuration, aircraft speed, runway head wind or tail wind component(s), weather, and runway surface conditions. Thus, on short runways, or more generally, on runways where the combination of runway length and the aircraft's landing and deceleration performance capabilities are critical, landing the aircraft as near as possible to the runway threshold is essential.

At present, pilots typically utilize landing performance data obtained from aircraft manufacturers to plan and execute landings. However, if landing conditions or the combination of landing conditions and the aircraft's capability vary such that landing performance margins are reduced, pilots have little time to abort the landing and execute a go-around. Furthermore, beyond the aircraft manufacturer's landing performance data, as well as, their own "out-the-window" visual monitoring and somewhat subjective determination, pilots have no robust system-aided feedback that gives them an indication of whether their aircraft will land at or before their desired landing point in the touchdown zone.

Thus, there is a need for a landing decision aid that will provide pilots feedback as too whether to continue the landing or execute a go-around.

SUMMARY

One way of meeting this need is a method and system for a Landing Decision Point (LDP) that processes airplane systems', pilot-provided, or other performance data for the pilots' desired LDP, displays the LDP on a graphical display, and provides visual, aural, and/or combined visual and aural cues if the airplane passes the LDP prior to touchdown.

In accordance with one aspect of the disclosure, a system for managing a Landing Decision Point (LDP) of an airplane comprises (1) a computer having instructions having contents that perform a method that includes receiving Landing Performance Information (LPI) for an airplane planning a landing on a runway; processing the LPI to determine the Landing Decision Point (LDP) for the airplane on the runway; and (2) a display operatively coupled to the computer to graphically display the LDP.

In accordance with another aspect of this disclosure, a cockpit device for managing a Landing Decision Point (LDP) of an airplane on an arrival runway, the device having a display system depicting display elements comprises a runway symbol indicating the arrival runway; a touchdown safe zone of the arrival runway indicating the safe zone for touchdown; and an LDP indicator on the runway symbol indicating a fixed go/no-go landing decision point for the airplane on the arrival runway.

In accordance with yet another aspect of this disclosure, a method of providing a Landing Decision Point (LDP) for an airplane on an arrival runway comprises receiving in real time Landing Performance Information (LPI) from a plurality of on-board systems; responsive to pilot input, receiving pilot additives for LDP determination; processing the received information to determine an LDP; providing the LDP to other airplane systems; and displaying graphical LDP information on whether to continue the landing.

It should be appreciated that this Summary is provided to introduce selected aspects of the disclosure in a simplified form that are further described below in the Detailed Description. This Summary is not intended to be used to limit the scope of the claimed subject matter. Other aspects and features of the present disclosure, as defined solely by the claims, will become apparent to those ordinarily skilled in the art upon review of the following non-limited detailed description of the disclosure in conjunction with the accompanying figures.

DETAILED DESCRIPTION

Figure 1:
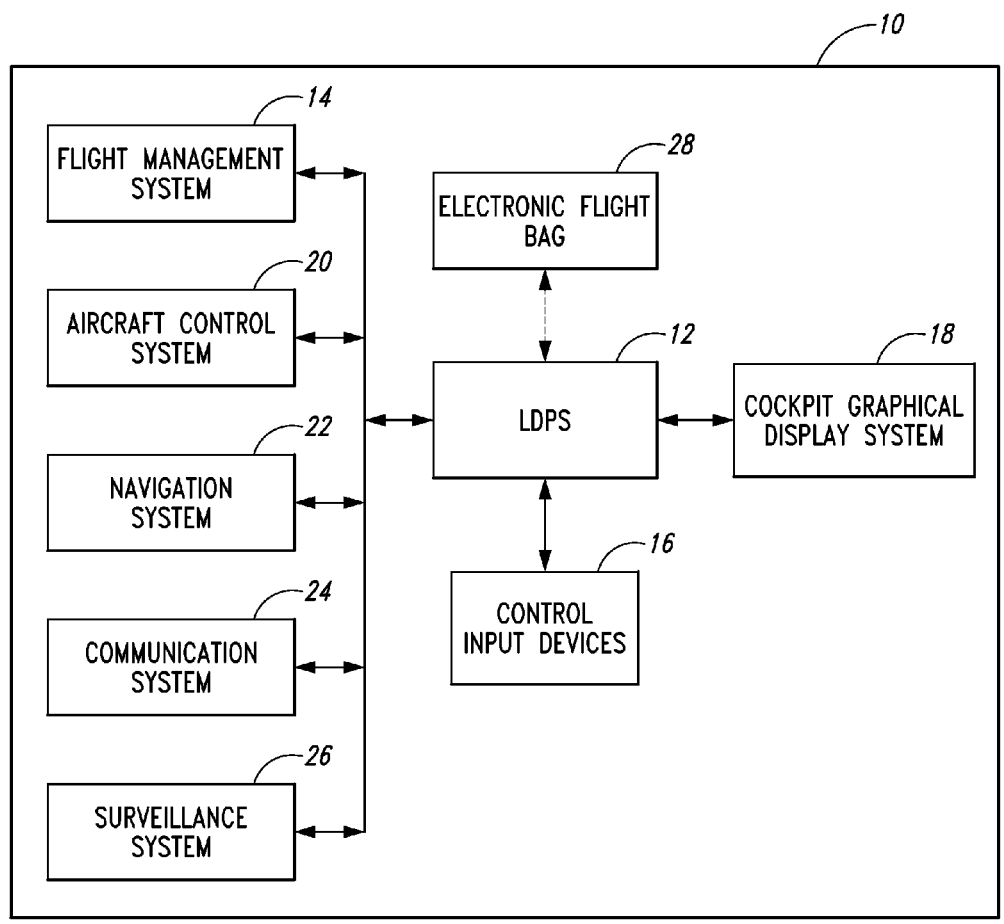
FIG. 1 is a schematic diagram of a generalized aircraft systems architecture centered on a Landing Decision Point System (LDPS).

The following disclosure describes methods and systems for a Landing Decision Point System (LDPS). Certain specific details are set forth in the following description and the figures to provide a thorough understanding of the various embodiments of the disclosure. Well-known structures, systems, and methods often associated with aircraft control, display, and related systems have not been shown or described to avoid unnecessarily obscuring the description of the various embodiments of the disclosure. In addition, those of ordinary skill in the relevant art will understand that the additional embodiments of the present disclosure may be practiced without several of the details described below.

Many embodiments of the disclosure described below may take the form of computer-executable instructions, such as routines executed by a programmable computer. Those skilled in the relevant art will appreciate that the invention can be practiced on other computer system configurations as well. The disclosure can be embodied in a special-purpose computer or data processor that is specifically programmed, configured, or constructed to perform one or more of the computer-executable instructions described below. Accordingly, the term "computer" as generally used herein refers to any data processor that can be engaged in a cockpit, including computers for cockpit display systems, Flight Management Computers (FMC), Flight Control Computers (FCC), Electronic Flight Bags (EFB), laptops, tablet computers, or other hand-held devices.

The disclosure can also be practiced in distributed computing environments, in which tasks or modules are performed via remote processing devices that are linked through a communication network such as those enabled via datalink by the aircraft communication systems. In a distributed computing environment, program modules or subroutines may be located in both local and remote memory storage devices. Aspects of the disclosure described below may be stored or distributed on computer-readable media, including magnetic or optically readable computer disks (e.g., removable disks), as well as distributed electronically over networks. Data structures and transmission of data particular to aspects of the disclosure are also encompassed within the scope of the disclosure. Information handled in accordance with aspects of the disclosure can be presented at displays or display media, for example, CRT screens, LCD screens, heads-up displays, or other suitable devices.

Modern commercial aircraft are equipped with several airplane systems to manage an aircraft's performance and to report to the pilots (flight crew) if the aircraft is not performing to the expected performance level. For example, during the landing phase of flight, a number of aircraft systems involving the aircraft's flight control, propulsion, navigation, thrust management, flight management, warning/advisory, brakes, and displays may be utilized to monitor and determine whether the aircraft's performance is satisfactory. Additional input, for example, from surveillance systems such as enhanced ground proximity warning system (EGPWS), weather radar (WXR), predictive wind shear system (PWS), traffic computers, and the like may also be available. However, in the end, the final determination on whether to proceed with the landing or perform a go-around rests with the pilots.

The landing phase of flight is one of the most critical phases of flight. Whether a manual or automatic landing is being performed, pilots must vigilantly monitor not only the performance of airplane systems but also the progression of the landing to execute a safe landing and roll out. One characteristic of all landings is the requirement to ensure the aircraft touches down at a point on the runway such that it can decelerate and stop, or exit the runway onto a taxi way, within the runway remaining. Thus, during the landing phase of flight, pilots are focused on landing their aircraft in the touchdown zone to ensure there is enough runway for a successful deceleration and rollout.

In this regard, pilots may be able to utilize more accurate means to determine when the go/no-go decision should be made with respect to performing the landing beyond the "out-the-window" visual monitoring. Furthermore, landing distance data, generally determined during an aircraft's certification, may require additional pilot judgment for the landing condition at hand that is encountered in daily operations.

For example, the touchdown zone is typically the first one third of the runway with the touchdown point being the midpoint of the zone. The touchdown point in the touchdowns zone, which may be different for each landing, is affected by a number of factors including but not limited to the aircraft's weight and configuration, aircraft speed, runway head wind or tail wind component(s), weather, and runway surface conditions. Some of these factors, especially those related to weather or runway surface conditions may be inaccurate or they may have changed after the aircraft has started its approach and/or landing phases of flight. Thus, on short runways, or more generally, on runways where the combination of runway length and the aircraft's landing and deceleration performance capabilities are critical, landing the aircraft not just on the first one-third of the runway but as near as possible to the runway threshold is essential.

Furthermore, many operators also state that a touchdown should be no further than 3000' from the runway threshold. However, during a landing where the performance of the airplane is critical, merely landing in the touchdown zone or within the first 3000' of the runway may not adequately provide the necessary distance to stop. In addition, during the landing, pilots have little time following touchdown to execute a go-around since advisory data landing distances assume that thrust reverser deployment may begin within two seconds of touchdown, and following the initiation of thrust reverser deployment, a go-around is no longer authorized.

Thus, on relatively more challenging landings, pilots may be able to use a more accurate guide than the aforementioned landing within the first one-third or first 3000' feet criteria as the pilots' efforts become time critical in their execution. Because of the aforementioned limitations, there is a need for landing decision aid that will provide pilots more accurate guidance and feedback as to where the go/no-go Landing Decision Point (LDP) is located relative to the runway threshold.

One way of meeting this need is a method and system for a Landing Decision Point (LDP) that processes airplane systems', pilot-provided, or other performance data for the pilots' desired LDP, displays the LDP on a graphical display, and provides visual, aural, and/or combined visual and aural cues if the airplane passes the LDP prior to touchdown.

Turning now to a more detailed discussion of the disclosure and the figures, FIG. 1 depicts an embodiment of generalized aircraft systems architecture 10, centered on an LDP system 12. FIG. 1 has been simplified in order to make it easier to understand the present disclosure. Those skilled in the art will appreciate that FIG. 1 is one non-limiting configuration of many that can be used to configure an airplane with an LDP system. Major aircraft systems that interface with the LDP system 12 include, the Flight Management System 14 (components such as the navigation database (NDB), Aerodynamic and Engine database (AEDB) not shown), Control Input Devices 16, Cockpit Graphical Display System 18, Aircraft Control System 20 (components of the aircraft control system such as flight control computers are not shown), Navigation System 22, Communication System 24, Surveillance System 26, and Electronic Flight Bag 28. The LDPS may be implemented as part of an existing on-board computer system such as a Flight Management system (FMS) 14, a warning or surveillance system 26, or a dedicated LDPS computer (not shown). Lastly, the display of LDP information may be presented on a cockpit graphical display systems (CGDS) 18, which typically comprises at least a graphics display computer (not shown) and a graphics display (not shown).

Figure 2:
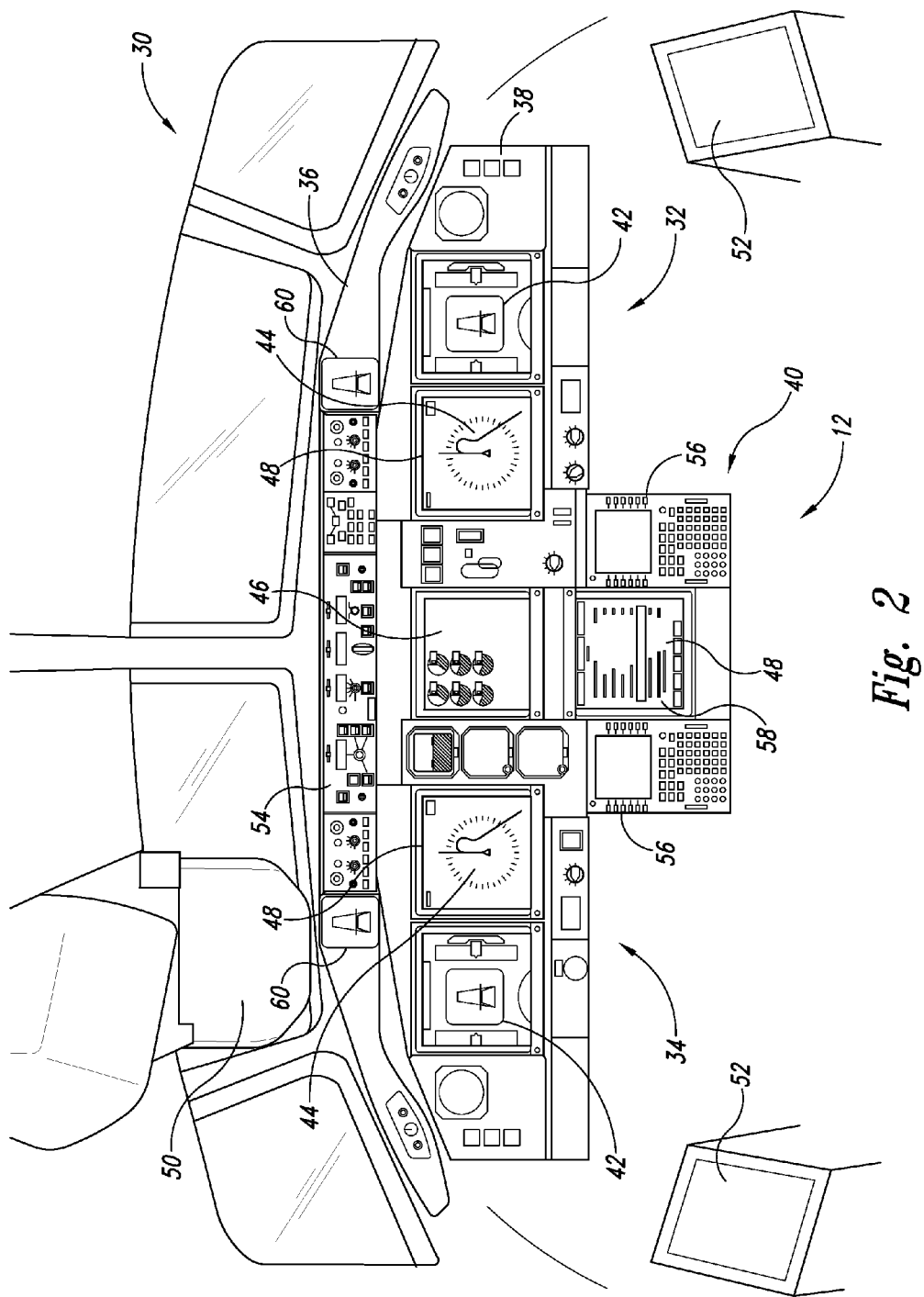
FIG. 2 is a diagram illustrating a cockpit having advantageous Landing Decision Point (LDP) display embodiments according to the disclosure.

With respect to displays, in various embodiments, shown in FIG. 2, is an aircraft cockpit 30 with systems that may interact with or host aspects of an LDPS 12. The cockpit includes a Mode Control Panel (MCP) 54 positioned on a glare shield 36, a forward instrument panel 38, and a control pedestal 40 with various instruments 32 and displays 34. The forward instrument panel 38 and the control pedestal 40 have a number of displays, including multifunction displays 48. As shown here, the multifunction displays 48 include a Navigation Display 44 and a Checklist Display 58. The aircraft's display system may include at least one of Primary Flight Display (PFD) 42, a Head-up Display (HUD) 50, a Navigation Display (ND) 44, a Multifunction Display (MFD) 48, a Control Display Unit (CDU) 56, a Crew Alerting Display 46, an Electronic Flight Bag (EFB) 52, or other displays in the cockpit such as a dedicated LDPS display 60 mounted on the glare shield 36. Dedicated LDPS displays 60 may also be installed at a suitable location on the forward instrument panel 38.

Figure 3:
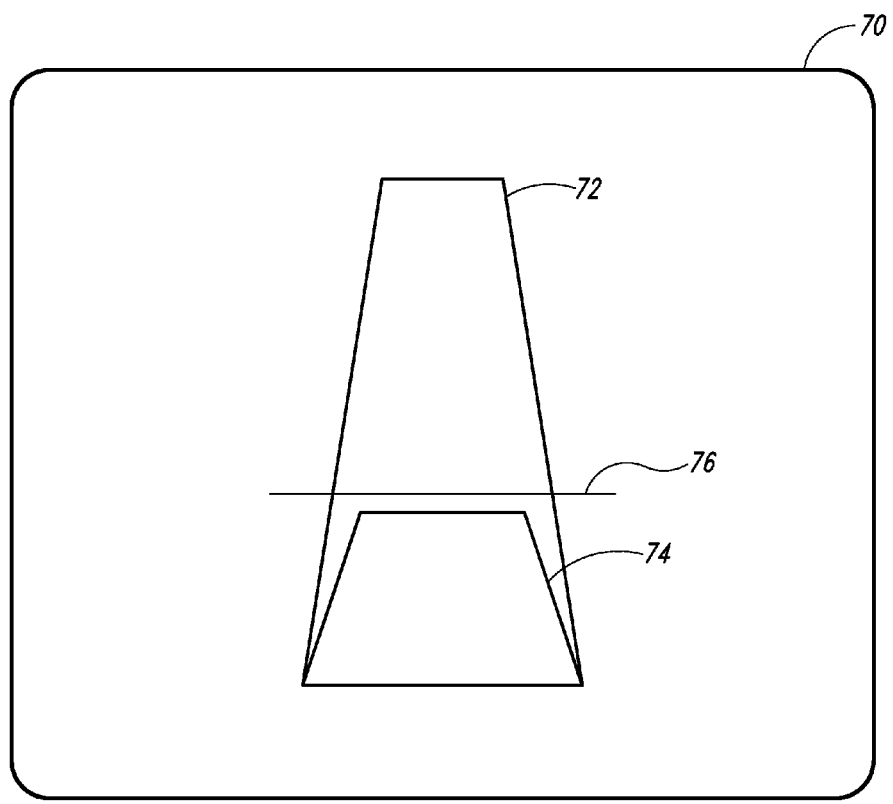
FIG. 3 illustrates the core elements of graphical LDP information on a display.

FIG. 3 illustrates the core elements of graphical LDP information on an LDP display 70. In various embodiments, the LDP display 70 can be made available on a number of cockpit displays such as the PFD 42, ND 44, a multifunction display 48, and HUD 50. Depending on the aircraft configuration, the LDP display 70 may be displayed to the crew in one or more displays.

The LDP display's 70 core elements of graphical LDP information include a runway symbol 72, a touchdown safe zone indicator 74, and a go/no-go landing decision point (LDP) indicator 76. The go/no-go LDP indicator 76 (hereafter called LDP indicator) is depicted here as a line but could also be depicted as a fence or other similarly representative symbol.

If the LDP display 70 is being hosted on shared display such as a PFD 42, an ND 44, and a HUD 50, additional textual and graphical information related to other functions of the shared display may also be shown. Such additional information related to other functions is not shown in FIG. 3 so as to not unnecessarily obscure the central display-related aspects of the disclosure but a few of them are discussed below as part of some non-limiting example embodiments.

Some non-limiting examples of potential cockpit display locations for the LDP display 70 are also shown in FIG. 2. In one distinct embodiment, graphical LDP information may be presented with the LDP indicator 76 displayed as a line or a fence as part of a modified (for example, color-coded) runway symbol on the PFD 42. In this embodiment, and depending on the aircraft configuration, at least one PFD 42 may display LDP information to the crew with one or more additional PFD symbology such as an airplane symbol, a horizon line, and a pitch bar such as, for example, those disclosed in U.S. Pat. No. 7,720,579, entitled "Method, System, and Computer Program Product for Performance Monitored Aircraft Rejected Takeoff Braking" and incorporated herein in its entirety by reference. Runway symbols such as rising runways or runways symbols used for takeoff braking performance and the like have been used in other distinct cockpit implementations. Thus, pilot familiarity with some of the symbology can aid in reducing training, increasing awareness, and increasing proficiency.

Figure 4:
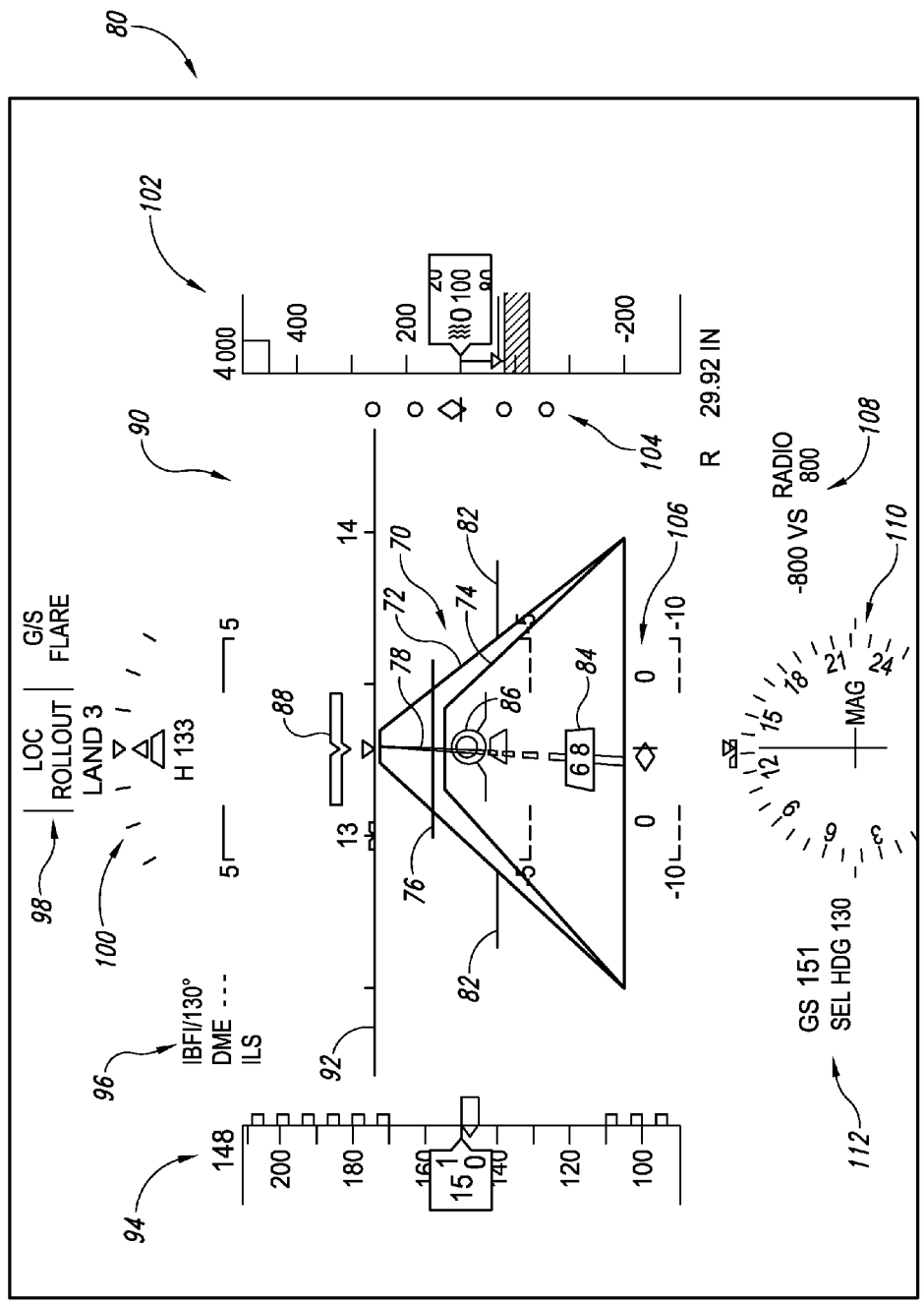
FIG. 4 is a diagram illustrating the display of LDP information on a Head-Up Display (HUD).

In another distinct embodiment shown in FIG. 4, LDP information may be displayed on the HUD 50 along with perspective runway symbology that is conformal to the arrival (landing) runway such as in a manner generally similar to that disclosed in U.S. patent application Ser. No. 12/815,347, entitled "Perspective Runway System" and incorporated herein in its entirety by reference. In this embodiment, the combined HUD and LDP display 80 has the LDP indicator 76 shown on the perspective runway outline symbology such that the pilot's "out the window" view shows the touchdown safe zone 74 and the LDP indicator 76 on the runway symbol 72. Additional symbology of this embodiment include a runway centerline 78; aim point 82 indicating a location where the airplane should touch down; radio altitude 84; flight path vector symbol with guidance cue 86; airplane symbol 88; pitch scale 90; horizon 92; airspeed indicators 94; approach reference data 96; flight mode annunciators and autoland status 98; roll scale and pointer 100; altitude indicators 102; glide slope deviation scale 104; localizer deviation scale 106; vertical speed and radio minimums 108; compass rose 110; and ground speed and selected heading 112.

Further distinct embodiments may include the display of LDP information on a Navigation Display (ND) 44 as part of an airport or runway map. In this embodiment, the touchdown safe zone 74 and the LDP indicator 76 are displayed on the arrival runway. The display of LDP symbology is in a manner generally similar the display of symbology braking and runway exiting symbology disclosed in U.S. Pat. No. 7,818,100, entitled "System and Method for Optimized Runway Exiting" and incorporated herein in its entirety by reference. For example, the touchdown safe zone 74 may be displayed as a color-coded rectangle and the LDP indicator 76 may be displayed as a line or a fence that can be easily distinguished by pilots from other airport or runway map symbology.

In yet further distinct embodiments such as embodiments in older aircraft or aircraft with older display systems, a dedicated LDPS display 60 attached to the glare shield 36 or attached to a suitable location on the forward instrument panel 38 and may provide LDP information. The LDP information displayed on a dedicated LDPS display 60 is substantially similar to that shown in FIG. 3 and would include a runway symbol 72, a touchdown safe zone 74, and an LDP indicator 76.

Preview and/or planning modes on an MFD 48, EFB 52, CDU 56, or other devices where LDP and runway map information can be displayed along with input means for pilots to manage landing parameters are further aspects that augment the aforementioned embodiments. For example, U.S. Pat. No. 7,818,100, FIGS. 8A and 8B disclose displays control buttons for changing one or more of the default/current landing parameters in accordance with one exemplary implementation. Those skilled in the art would understand how preview and/or planning modes can be implemented to show the LDP indicator 76 as a function of pilot input. Preview and/or planning modes provide pilots with visual feedback as to the arrival runway and its touchdown safe zone 74 while they are planning the landing during cruise, descent, or approach phases of flight.

Lastly, one may incorporate one or more of the above distinct embodiments in an airplane configuration. For example, in a particular combinatorial embodiment, one may choose to have an LDPS 12 providing LDP information to the HUD 50 for the flying pilot while simultaneously providing the same LDP information to a PFD 42 or to an ND 44 to the monitoring (non-flying) pilot. In this embodiment, the flying pilot can see the LDP indicator 76 in his "out-the-window" view, while the monitoring pilot can see, for example, a color-coded touchdown safe zone 74 on the PFD where the color-coding can be a function of factors such as distance from the runway threshold (bottom of touchdown safe zone 74) to the top of touchdown safe zone 74; weight-on-wheels, landing gear strut compression; tire rotation; nose gear compression; spoiler deployment, and the like.

Turning now to other aspects of the LDPS, the LDPS may be interfaced with a number of aircraft on-board systems to receive Landing Performance Information (LPI) required to process and provide information to the pilots as to the landing performance of the airplane. The reception is continuous until stopped; thus the system is continuously updated with the latest data. Such information is typically provided via digital data bus from each system. This is done today on many types of modern aircraft and the person skilled in the art would understand how such interfaces are implemented.

In this regard, the LDPS 12 may be connected to receive information from systems such as the aircraft control system 20; navigation system 22 including components such as air data and inertial reference units (ADIRU) and Global Positioning System (GPS); the flight management system (FMS) 14; thrust management system; gear system; brake system; air/ground system; propulsion (engines) system; warning systems (with both aural and visual outputs); communications system 24 such as AGARS; surveillance system 26 including EGPWS, WXR, PWS, and ADS-B or other traffic surveillance systems; display systems, electronic flight bag (EFB) 28; maintenance system; as well as other systems and control input devices 16 for accepting and processing control inputs such as a control display unit, keyboards, cursor-control devices, touch-screen devices, and interactive displays.

Based on received LPI data from the interfacing systems, and other pilot-provided data (pilot additive(s)), the LDPS determines the LDP and displays the LDP indicator 76 on a graphical display. Such received LPI data may include real time airplane flight operating parameters and data such as but not limited to instantaneous groundspeed; acceleration; instantaneous and trending indicated airspeed; GPS position; inertial position; ground track; runway length; runway elevation; runway slope; runway conditions; weather conditions such as wind speed and direction; landing weight; the configuration of the wing high-lift devices; and any health monitoring parameters related to engines, brakes, or other aforementioned systems. This data is updated continuously and the determination of actual performance is updated at a suitable rate to enable up to date transmission of LDP information to the pilots on cockpit instruments.

Received LPI data may also include additional sensed or reported data coming via the communication system 24 or surveillance system 26. For example and without limitation, such data may include data related to wind shear forming on the runway and/or landing flight path, traffic (unexpected aircraft) on the runway, or other input that may be relevant for the pilot's decision on whether or not to proceed with the landing. Communicated data may also include data such as runway conditions as reported by aircraft which previously performed landings on the runway, runway conditions as reported by Air Traffic Control (ATC), Air Traffic Service Providers (ATSP), or other data providers.

In this regard, as those skilled in the art appreciate how the determination and communication of runway conditions can be utilized in an LDPS, only a minimal overview of one implementation is discussed. For example, U.S. Pat. No. 7,586,422 entitled "Determination of Runway Landing Conditions", and incorporated herein in its entirety by reference, discloses how to get braking data from landing aircraft, calculate braking performance, and determine normalized barking performance. Further, U.S. Pat. No. 7,626,513 entitled "Communication of Landing Conditions", and incorporated herein in its entirety by reference, discloses how to communicate braking information to air traffic control and/or other aircraft. Lastly, U.S. patent application Ser. No. 12/124,519 entitled "Method and System for Determining Effectiveness of an Aircraft Braking System on an Aircraft during an Aircraft Landing" and incorporated herein in its entirety by reference, discloses how to calculate and disseminate a scalar digital deceleration value of landed aircraft to downstream users.

Once such braking or deceleration information is transmitted to landing aircraft via, for example, Automatic Dependent Surveillance-Broadcast (ADS-B) or AGARS, the receiving aircraft's communication system 24 or surveillance system 26 can make this information available to the LDPS 12 for pilots to utilize in planning or determining their LDP.

Another feature of this disclosure is that the LDPS may be partially or wholly implemented as a distributed system. In this regard, an Airline Operational Center (AOC), a service center at an airport facility, an ATSP, or an air traffic control agency may be equipped with some LDPS functions hosted on a suitable computer, hereafter called the off-board portion of the LDPS computer/system.

In one distinct off-board embodiment, the off-board portion simply rebroadcasts available braking performance gathered from aircraft which have landed (hereafter landed aircraft) to landing aircraft. Suitably equipped landing aircraft which receive the rebroadcast via the aircraft's communication system 24 or surveillance system 26 can make this information available to the LDPS 12 for pilots to utilize in planning or determining their LDP.

In another distinct off-board embodiment, given an airplane, its performance characteristics, and its landing configuration, the off-board computer with LDPS functions would then be able to calculate an LDP for that airplane in a similar way as would be calculated onboard an airplane for all of the airports' candidate runways and provide the information to subscribers such as but not limited to pilots of landing aircraft, an AOC, an air traffic service provider (ATSP), or air traffic control (ATC). This off-board calculated LDP from the off-board LDPS can provide subscribing pilots of landing aircraft another check for the LDP calculated on-board their aircraft or can provide a reference/guide if performance calculation via on-board LDP function is not available.

The off-board portion of the LDP system has at least two safety enhancing advantages. First, it makes available the same capability as what is on board the airplane to subscribers such as flight control/dispatch, AOCs or others who assign and uplink arrival runway information to pilots. By utilizing this capability, providers of arrival runway information will help insure that runways that cannot be utilized by a particular aircraft will not be listed/uplinked as a candidate or assigned runway for landing for that particular aircraft in the first place. By reducing the potential for undesirable runway assignments, this off-board functionality can reduce pilot workload as pilots do not have to sift or plan through a list of runways, some of which may not be suitable for their airplane's landing. By reducing the chance for late runway changes due to less optimal arrival runway assignments, the off-board portion also reduces ATC controller workload, and potentially improve air traffic flow.

Second, the off-board portion's calculations serve as a check against errors such as data entry errors or configuration errors that can occur on the on-board portion. For example, if there is a significant mismatch between the off-board calculated LDP and the on-board calculated LDP, the mismatch can be made available to the pilots via a message such as "LDP DISAGREE" or other textual or graphical symbols on one or more cockpit displays. In this manner, errors can be caught and corrected well before the airplane starts its landing phase of flight. Thus, the crew for example can get an uplink of the off-board portion's calculations for comparison with their own on-board calculations such that they may identify and correct any anomalies prior to beginning the landing phase of flight.

The off-board portion of an LDPS system may also utilize sensors on runways or near the airport to detect aircraft on a runway via the aircraft's ADS-B transmission and to monitor aircraft's landing and rollout, takeoff roll, or rejected takeoff roll as a function of both (1) reported braking performance via ADS-B transmissions from the aircraft and (2) runway sensors (e.g., motion, camera, etc.) such that runway surface condition and landing performance (e.g. landing, takeoff, rejected takeoff, etc.) is monitored, compared with predicted performance, and if the actual performance is less than the predicted performance, a correction and/or advisory is issued to other landing aircraft via suitable means.

Lastly, while this off-board aspect of LDPS may be used in conjunction with the on-board LDPS, it is also useful for aircraft such as general aviation aircraft or older commercial that may not have an LDPS system on board. If such aircraft are equipped with a suitable display system, pilots may be able to use the uplinked braking performance or LDP information directly on the display to get a better feel or expectation of the landing they are about to perform.

Turning now to the on-board implementation of an LDPS 12, a number of configurations to the aforementioned overall system configuration are possible. As discussed above, the LDPS 12 may be implemented as part of an existing on-board computer system such as an FMS 14, a warning or surveillance computer 26, or a dedicated LDPS computer system. The LDPS 12 calculates the LDP based on a number of parameters such as Performance In-flight (PI) Advisory Landing Data, data from other onboard performance tools, uplinked data, or other data provided automatically or directly from other onboard systems or provided manually by the flight crew.

In general, LDPS 12 may calculate two types of LDP. The first type of LDP is an automatic or default LDP that would incorporate certain assumptions, possibly including conservative assumptions for landing performance. For example, based on current landing weather conditions, assigned runway, runway length, runway surface conditions (e.g., dry, wet, snow, slush, etc.) aircraft weight, assumed or available configurations of systems and devices such as brakes, thrust reversers, and the like, the LDPS 12 calculates an LDP for the assigned arrival runway and displays the LDP indicator 76 at a suitable time during final approach.

The second type of LDP is a manually calculated or manually augmented LDP that includes pilot (flight crew) additives. In addition to the above factors used in the calculation of the default LDP, the manual LDP accepts flight crew additives that are additional input that apply specifically to the landing the crew is about to perform. For example, flight crew additives may include input such as available runway length, deteriorating runway conditions, accuracy of reported braking action, expected landing speed, condition of the aircraft's thrust reversers or other braking systems, personal fatigue, airport familiarity, and airplane type familiarity.

Handling of the aforementioned LDP inputs and the calculation of both types of LDP can occur on one or more of aircraft systems such as the FMC 14, a CDU 56, and control input devices 16. Handling and calculation methods have been previously disclosed in U.S. Pat. No. 7,818,100, for example as shown in its FIGS. 7A-7H, and the person skilled in the relevant art will understand how to implement such methods on aircraft systems.

When the LDPS 12, based on the aforementioned inputs, determines the LDP, for example and without limitation, as distance from the runway threshold, the LDP is provided to the pilot for manual input to be provided to the display system or is made available directly by the LDPS 12 to the display system. If the aircraft configuration admits automatic handling of the LDP, the LDP display 70 will display the LDP indicator 76 at an appropriate point during the approach and landing phase of flight. If the aircraft configuration, such as that of an older commercial aircraft or general aviation aircraft, does not admit automatic handling of the LDP, a pilot may manually provide the LDP to the display system such that the LDP display 70 displays the LDP indicator 76 at a suitable point during flight. Such appropriate or suitable point during flight may be determined as function of altitude, distance from runway threshold, gear configuration, or other similar aircraft configuration-based triggers.

Once the LDP is determined, as described earlier the LDP display 70 may be provided in various embodiments on the PFD 42, ND 44, HUD 50, or a dedicated LDPS display 60. For example, in the case of the HUD 50, the LDPS transmits LDP data to the HUD system such that the HUD system displays LDP information, including the LDP indicator 76 on the HUD. The LDP indicator 76 displayed on the HUD more readily and more accurately identifies to the flight crew a predetermined point along the runway to initiate a go-around if the wheels have not yet touched down. In various embodiments, the LDP may be represented by a graphical symbol such as a, a line, a fence, or a translucent oval pinned to the ground or runway symbol at a point on the runway identifying the LDP.

In terms of operating an airplane utilizing an LDPS, pilots may direct the LDPS 12 to perform a number of the following steps the order of which may vary. First, prior to approach, a pilot determines the landing distance per advisory landing data or the LDPS may determine and propose the LDP based on advisory landing data and other received data as discussed earlier. Second, and optionally, a pilot may also add adjustments to the LDP calculated in the first step above. In terms of the earlier description, the LDP calculated in the first step corresponds to the automatic LDP and the LDP calculated in the second step corresponds to the manual LDP.

Next, the LDP display 70 including the LDP indicator 76 will be displayed on a graphical display such as the HUD 50 at an appropriate time during approach. Optionally, the LDP display may be available in preview or planning mode on a number of cockpit displays while the pilot is handling LDP-related data.

During landing, if the airplane proceeds to touchdown before the LDP, the LDP indicator 76 will be removed from the display at touchdown and the airplane will continue its landing roll. Touchdown may be determined, in various embodiments, using a number of different inputs such as air/ground proximity sensors, weight-on-wheels, landing gear strut compression, tire rotation, radio altitude, and the like.

If on the other hand, the airplane passes the LDP and has not yet touched down, the LDP indicator 76 (with optionally different color or shape combination to warn the crew that they are past the LDP) or non-LDP graphical or alphanumeric symbology may be displayed, advising the crew to perform a go-around. The runway symbol 72 and the touchdown safe zone 74 may also be displayed in different colors to indicate to the crew that a go-around is advised. Additionally, an aural warning, in combination with or separately from the LDP, may be provided to provide increased awareness to the crew that the airplane has passed the LDP without touching down.

In one distinct embodiment applicable to PFD 42 and ND 44 hosted LDP displays 70, the touchdown safe zone 74 may be displayed in a first color prior to touchdown, a second color different from the first color if the aircraft touches down before the LDP, and a third color different that the first two colors, if the aircraft passes the LDP without touching down. Optionally, the portion of the runway symbol 72 beyond the LDP indicator 76 may be displayed in a first color prior to touchdown, a second color different from the first color if the aircraft touches down before the LDP, and a third color different that the first two colors, if the aircraft passes the LDP without touching down.

Figure 5:
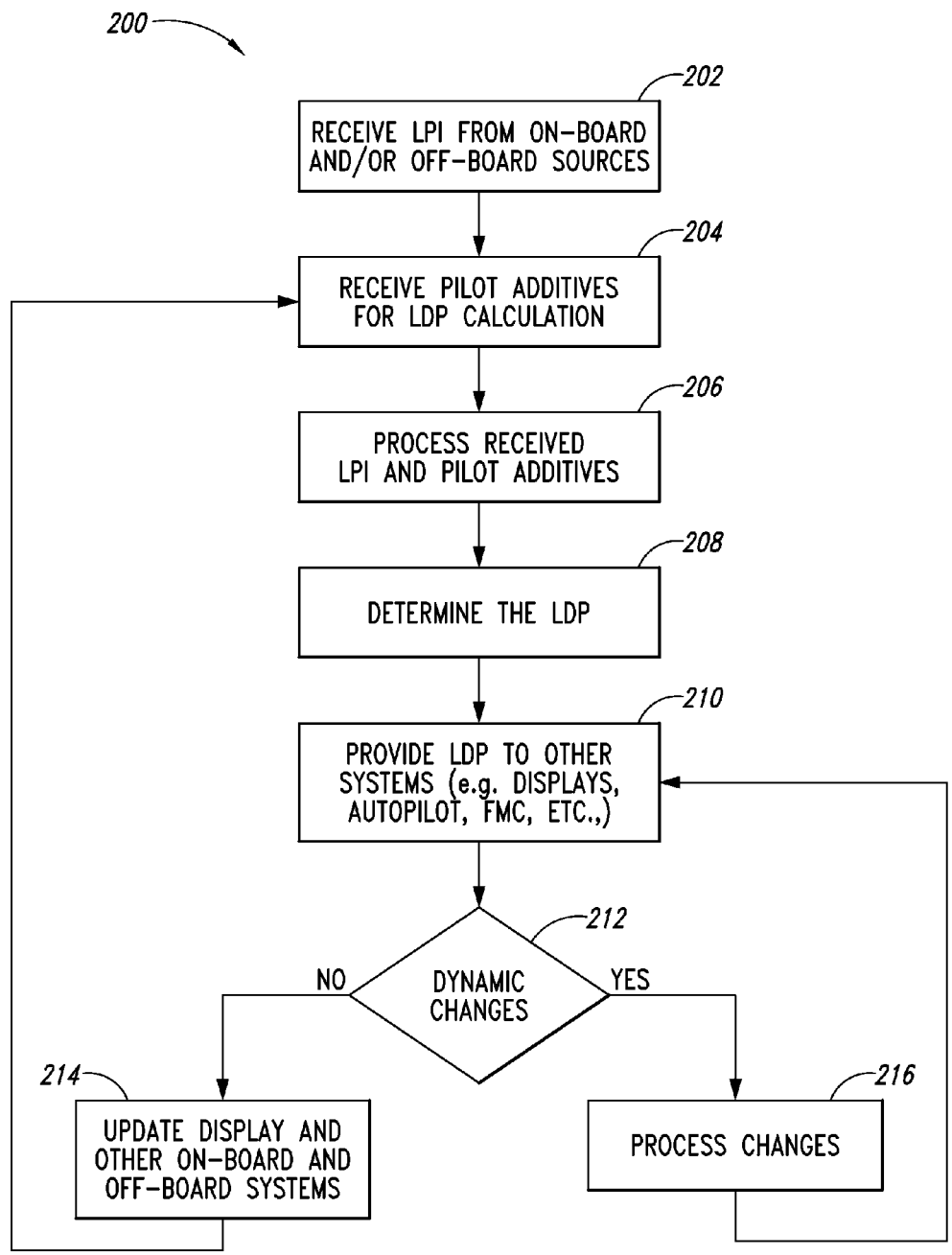
FIG. 5 is a flow diagram of an example of a method by which an advantageous embodiment of the disclosure may be implemented.

FIG. 5 depicts a general method 200 by which the disclosure may be implemented. The display of graphical information on display systems such as those utilized by pilots in a modern aircraft display system, including the reception, transmission, storage, and retrieval of flight operations-related parameters such as airspeeds, weather, runway surface condition, weight, etc., have been previously implemented in industry. Those skilled in the art would understand how the placement of display symbology as well as storage and retrieval of approach procedures would be accomplished on aircraft systems, and that the depiction herein is one of several possible methods of displaying symbology.

It should be appreciated that the logical operations described herein are implemented (1) as a sequence of computer implemented acts or program modules running on a computing system such as a Flight Management Computer (FMC) and/or (2) as interconnected machine logic circuits or circuit modules within the computing system. The implementation is a matter of choice dependent on the performance and other requirements of the computing system. Accordingly, the logical operations described herein are referred to variously as steps, operations, or acts. These states, operations, or acts may be implemented in software, in firmware, in special purpose digital logic, and any combination thereof. It should also be appreciated that more or fewer operations may be performed than shown in the figures and described herein. These operations may also be performed in a different order than those described herein.

As will be appreciated by one of skill in the art, the present disclosure may be embodied as a method, system, apparatus, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Now referring to FIG. 5, an LDPS 12 on board an airplane may, for example, perform the following steps. As a preliminary step, a pilot initiates the LDPS 12. Alternatively, an on-board computer may automatically initiate the LDPS 12 as a function of phase of flight or other suitable context-sensitive criterion. This initiation step may entail simply turning on the system; choosing the LDPS 12 from a plurality of available cockpit applications; making or confirming a plurality of selections via a control input device 16; or providing the LDPS 12 additional information from another system such as the Flight Management System (FMS) 14, the Navigation System 22, the Communication System 24, or the Surveillance System 26.

Next, in step 202, the LDPS 12 receives in real-time Landing Performance Information (LPI) (described above) from on-board, and optionally, from off-board sources (systems) such as the FMS 14, Navigation System 22, etc., and storage devices such as databases. This step includes receipt of information necessary to determine the aircraft's configuration such as weight, flap settings, weather, runway conditions and/or other configuration information that factors into LDP processing in steps 206 and 208 below.

In step 204, the LDPS 12 receives pilot-additives (described above) for LDP calculation. Pilot additives may be provided by the crew utilizing devices such as a multifunction control display unit, touch-screen devices, cursor control devices, and interactive displays. In various embodiments, step 204 may be skipped, if for example, the pilot is satisfied with the automatically calculated LDP; if the airline requires pilots to use the LDP without pilot-additives; or if the airplane is configured such that the pilots do not have the capability to input pilot-additives.

In step 206, the LDPS 12 processes the received data. The processing of received data may take place in a dedicated LDPS computer, a flight management computer, or another airplane computer hosting the LDPS 12.

In step 208, the LDPS 12 determines the LDP utilizing the processed data in step 206. If the LDP cannot be determined, an appropriate visual, aural, or combined visual and aural advisory or other message is provided to the crew via the displays or other systems.

Next, in step 210, the LDPS 12 provides the LDP to other systems. The LDP is provided to other on-board systems such that the receiving systems may utilize it to, for example and without limitation, display the LDP indicator 76; trigger an aural warning; calculate a touchdown point for automatic landing consistent with the LDP; adjust a landing speed; cross-check for a late parallel runway change; record on a digital flight data acquisition unit (flight recorder); provide other airplane systems related calculations or services; and downlink via the communications system 24 or the surveillance system 26 to AOC or other ground facility. With respect to the downlink of the LDP to AOC or air traffic control, the downlink may include a list of arrival runways the transmitting airplane—given its configuration—can land on, or the list of runways it may not be able to utilize for landing.

In step 212, the LDPS 12 monitors dynamic changes in the landing configuration and/or landing performance. For example, the LDPS 12 monitors for any late dynamic changes such as a command to go-around or a late runway change to a parallel runway that may necessitate a different LDP calculation.

In step 214, the LDPS 12 updates displays and other on-board and off-board systems. The LDPS updates other systems such as display systems, warning systems, the autopilot, autothrottle, autobrake, or other on-board or off-board systems continuously, or at a suitable frequency, with the most current LDP. The LDP information may contain LPI such as but not limited to selection of desired or required arrival runway from a list of candidate runways at the destination airport.

In step 216, the LDPS 12 processes the dynamic changes affecting the LDP. The LDPS 12 processes any late dynamic changes such as a command to go-around or a late runway change to a parallel runway that may necessitate a different LDP calculation and update the LDP processing appropriately and provide an updated LDP, an advisory message, a caution message, a warning message or other information to the crew. The LDPS 12 also processes, in real time, the landing performance of the airplane, and if for example, the airplane passes the LDP without landing, the processing can be used to display different symbology as discussed above to indicate to the crew to perform a go-around.

Figure 6:
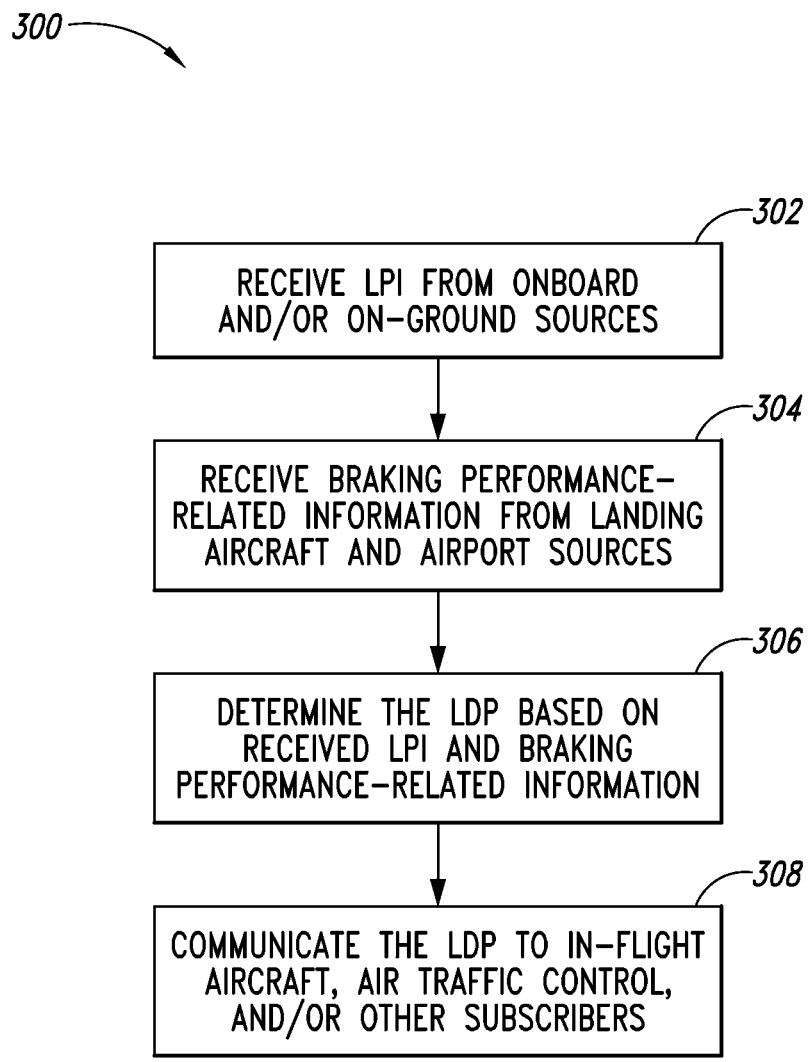
FIG. 6 is a flow diagram of an example of a method by which another advantageous embodiment of the disclosure may be implemented.

Turning now to methods applicable to an off-board implementation, FIG. 6 illustrates a general off-board LDPS method 300 for calculating and communicating an LDP. The off-board LDPS may be hosted on a suitable computer with modules such as a data collection module, a calculation module, and a communication module. The off-board LDPS may also optionally include or be communicatively connected to sensors on the airport surface that detect, for example, runway surface conditions, weather, and landing aircraft braking performance.

In step 302, the off-board LDPS receives landing performance information (LPI) from in-flight and/or on-ground sources (systems). The LPI may be available as a downlink from landing aircraft. Alternatively or simultaneously, some LPI information may also come from on-ground sources such as databases at the airport facility or at the airline which may store default landing parameters as well as real-time actual or projected flight operating parameters and landing configuration as discussed earlier.

In step 304, the off-board LDPS receives braking performance-related information from landing aircraft and/or airport sources. With respect to landing aircraft, braking performance-related information may come from landing aircraft as disclosed in U.S. Pat. No. 7,626,513, entitled "Communication of Landing Conditions". Braking performance-related data may come in the form of, for example, a scalar digital deceleration value such as that calculated in U.S. patent application Ser. No. 12/124,519 entitled "Method and System for Determining Effectiveness of an Aircraft Braking System on an Aircraft during an Aircraft Landing".

Next, in step 306, the off-board LDPS determines the LDP based on the received LPI and received braking performance from the preceding steps. The calculation of the LDP is made for each particular landing aircraft and takes into account similar data that is used in the calculation of the LDP by the on-board system as described earlier in this disclosure.

Lastly, in step 308, the off-board LDPS communicates the LDP to landing aircraft, ATC, and/or other subscribers or requestors. The LDP may be communicated, for example, in distance from the runway threshold of the arrival runway for a particular aircraft.

The subject matter described above is provided by the way of illustration only and should not be construed as limiting. While preferred embodiments have been described above and depicted in the drawings, other depictions of data tags and graphics symbology can be utilized in various embodiments of the disclosure. Graphical symbology may be used in place of text-based indications. Measurement units such as feet, meters, or miles may be suitably changed as appropriate for the task, custom, or convention. Lastly, the nomenclature, color, and geometric shape of the display elements can be varied without departing from the scope of the disclosure as defined by the appended claims.

We claim:

1. A method of providing a Landing Decision Point (LDP) for an airplane on an arrival runway comprising:
   receiving in real time Landing Performance Information (LPI) from a plurality of on-board systems;
   responsive to pilot input, receiving pilot additives for the LDP determination;
   processing the received information to determine a go/no-go LDP for the airplane;
   providing the go/no-go LDP to the plurality of on-board systems; and
   displaying on an LDP display a graphical LDP information on whether to continue the landing.

2. The method of claim 1 further comprising responsive to a determination of a change in the LPI, processing the change to provide an updated go/no-go LDP to the plurality of on-board systems.

3. The method of claim 1 wherein the graphical LDP information comprises a runway symbol, a touchdown safe zone, and an LDP indicator on the runway symbol for indicating a fixed go/no-go LDP for the airplane.

4. The method of claim 1 further comprising providing aural landing performance advisory information.

5. The method of claim 1 wherein displaying graphical LDP information on whether to continue the landing further comprises:
   displaying an LDP indicator in a first color prior to touchdown;
   responsive to a determination that the airplane touched down before the go/no-go LDP, removing the LDP indicator from the display; and
   responsive to a determination that the airplane passed the go/no-go LDP before touching down, displaying the LDP indicator in a second color different than the first color.

6. The method of claim 1 wherein the plurality of on-board systems comprise a control input device, a Flight Management System, a Cockpit Graphical Display System, a Navigation System, a Surveillance System, a Communications System, an Aircraft Control System, and an Electronic Flight Bag.

\* \* \* \* \*